(12) United States Patent
Yashiro et al.

(10) Patent No.: US 7,602,980 B2
(45) Date of Patent: Oct. 13, 2009

(54) IMAGE PROCESSING APPARATUS AND METHOD

(75) Inventors: Satoshi Yashiro, Kanagawa (JP); Hirotaka Shiiyama, Kanagawa (JP); Hiroshi Tojo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 929 days.

(21) Appl. No.: 10/618,050

(22) Filed: Jul. 14, 2003

(65) Prior Publication Data

US 2004/0012623 A1    Jan. 22, 2004

(30) Foreign Application Priority Data

Jul. 18, 2002    (JP) .............................. 2002-210160

(51) Int. Cl.
*G06K 9/36*    (2006.01)
(52) U.S. Cl. ..................... 382/236; 348/222.1
(58) Field of Classification Search .................. 382/232, 382/233, 236, 190; 348/222.1; 715/723
See application file for complete search history.

(56) References Cited

U.S. PATENT DOCUMENTS

2003/0016291 A1*    1/2003    Tojo ........................ 348/222.1

* cited by examiner

*Primary Examiner*—Duy M Dang
(74) *Attorney, Agent, or Firm*—Fitzpatrick, Cella, Harper & Scinto

(57) ABSTRACT

This invention discloses an image processing apparatus which divides moving image data at appropriate positions and sets key frames at appropriately distributed positions in the entire moving image. This image processing apparatus records action information (e.g., a zoom action) associated with actions made during image sensing and environment information (e.g., rotation information due to a pan action) associated with an image sensing environment during image sensing as additional information of the moving image data. Then, the apparatus divides moving image data for one shot into a plurality of sub-shots (S807, S811) in accordance with at least one of the recorded action information and environment information (S802-S806, S808-S810).

36 Claims, 15 Drawing Sheets

FIG. 3

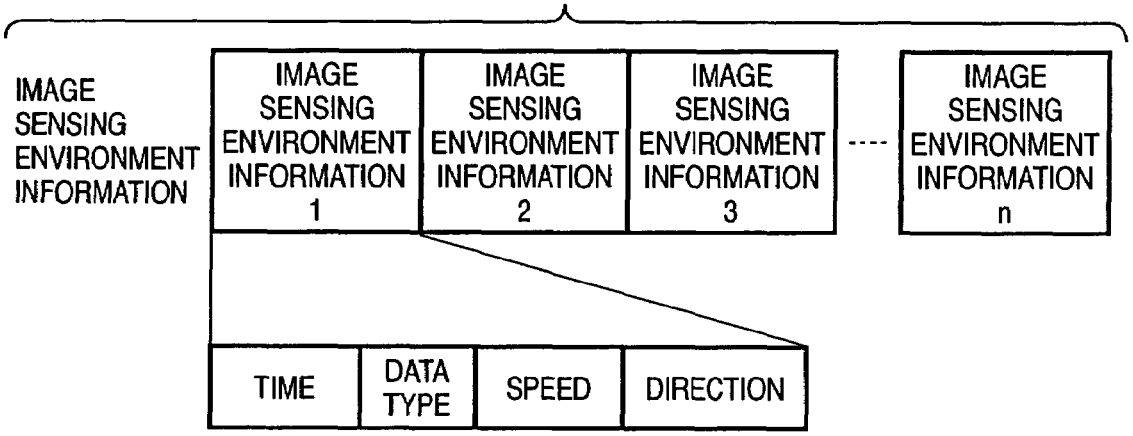

TIME [32 BIT]
  DESCRIBE FRAME NUMBER WITH REFERENCE TO HEAD OF MOVING IMAGE FILE

DATA TYPE [8 BIT]
  DESCRIBE INFORMATION TYPE OF IMAGE SENSING ENVIRONMENT INFORMATION

0...PAN START

1...PAN CONTINUATION

2...PAN END

4...TILT START

5...TILT CONTINUATION

6...TILT END

SPEED [3 BIT]
  DESCRIBE PAN/TILT SPEED IN 7 LEVELS WHEN DATA TYPE = 0, 1, 4, or 5

1...LOWEST SPEED    7...HIGHEST SPEED

DIRECTION [1 BIT]
  DESCRIBE PAN (RIGHT/LEFT) OR TILT (UP/DOWN) DIRECTION WHEN DATA TYPE = 0, 1, 4, or 5

0...LEFT OR DOWN    1...RIGHT OR UP

FIG. 4

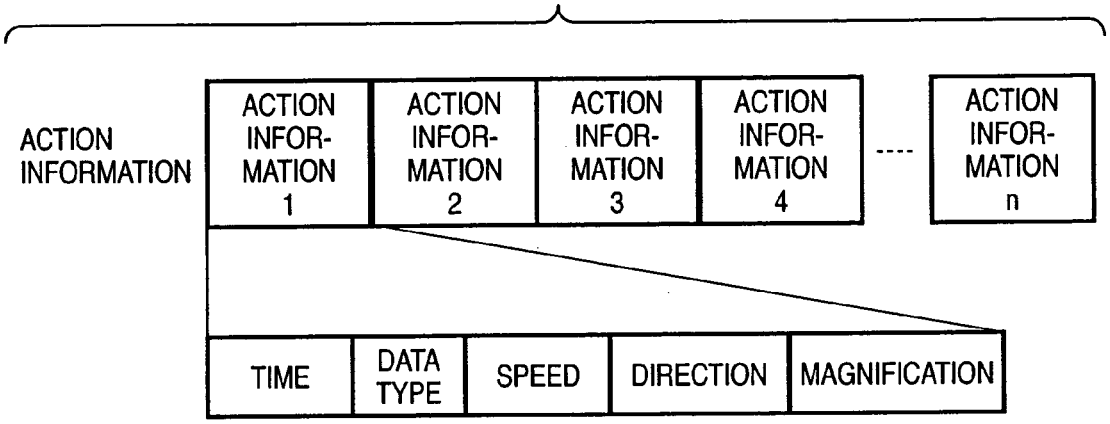

TIME [ 32 BIT ]
   DESCRIBE FRAME NUMBER WITH REFERENCE TO HEAD OF MOVING IMAGE FILE

DATA TYPE [ 8 BIT ]
   DESCRIBE INFORMATION TYPE OF IMAGE SENSING ENVIRONMENT INFORMATION

0...ZOOM START

1...ZOOM CONTINUATION

2...ZOOM END

3...VIDEO RECORDING START

4...VIDEO RECORDING END

SPEED [ 3 BIT ]
   DESCRIBE ZOOM SPEED IN 7 LEVELS WHEN DATA TYPE = 0, 1, OR 2

1...LOWEST SPEED    7...HIGHEST SPEED

DIRECTION [ 1 BIT ]
   DESCRIBE ZOOM DIRECTION WHEN DATA TYPE = 0, 1, OR 2

0...TELE SIDE    1...WIDE SIDE

MAGNIFICATION [ 5 BIT ]
   DESCRIBE ZOOM MAGNIFICATION IN 32 LEVELS WHEN DATA TYPE = 0, 1, OR 2

0...TELE SIDE    31...WIDE SIDE

FIG. 5

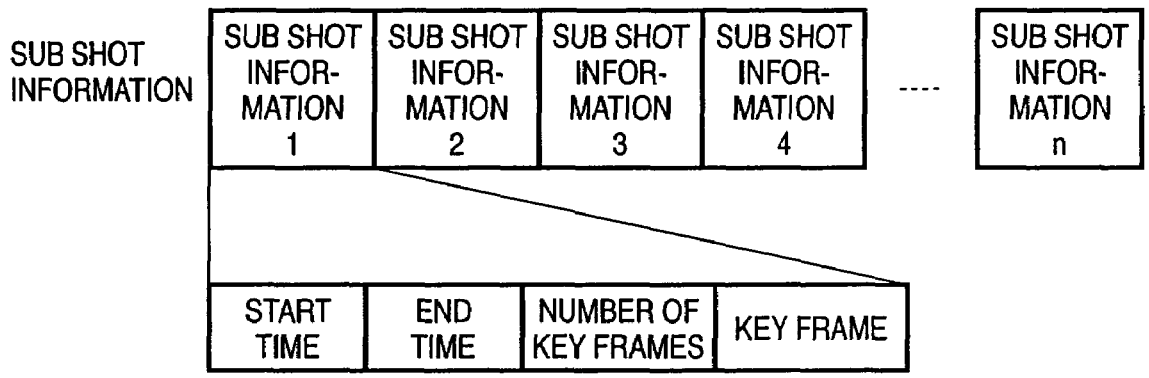

START TIME [ 32 BIT ]
    DESCRIBE START POINT USING FRAME NUMBER WITH
    REFERENCE TO HEAD OF MOVING IMAGE FILE

END TIME [ 32 BIT ]
    DESCRIBE END POINT USING FRAME NUMBER WITH
    REFERENCE TO HEAD OF MOVING IMAGE FILE

NUMBER OF KEY FRAMES [ 8 BIT ]
    DESCRIBE NUMBER OF KEY FRAMES

KEY FRAME [ 32 BIT * N ]
    DESCRIBE KEY FRAME USING FRAME NUMBER WITH
    REFERENCE TO HEAD OF MOVING IMAGE FILE
    KEY FRAME FIELDS LINE UP IN CORRESPONDENCE WITH
    NUMBER DESIGNATED BY NUMBER OF KEY FRAMES

NUMBER OF DATA TYPES   [ 16 BIT ]

DESCRIBE NUMBER OF FOLLOWING INFORMATION TYPES

DATA TYPE   [ 8 BIT ]

DESCRIBE INFORMATION TYPE OF ACTION INFORMATION / IMAGE SENSING ENVIRONMENT INFORMATION

0...ZOOM    1...PAN    2...TILT

NUMBER OF EVENTS   [ 32 BIT ]

DESCRIBE NUMBER OF TIMES OF START OF EVENT DESIGNATED BY DATA TYPE

IMAGE PROCESSING APPARATUS AND METHOD

FIELD OF THE INVENTION

The present invention relates to an image processing apparatus and method and, more particularly, to a technique for appropriately dividing a sensed moving image.

BACKGROUND OF THE INVENTION

As a conventional method for extracting image frames (called "representative images" or "key frames") that represent a given moving image from that moving image, a method of calculating differences between neighboring image frames, determining division points on the basis of the degrees of change (differences), and selecting a predetermined frame (e.g., first, last, or middle frame) of each division as a key frame is available. Such key frames are generally used to edit, manage, search, and categorize moving images.

Originally, key frames are preferably set at appropriately distributed positions in entire moving image data. The aforementioned method is effectively applied to already recorded moving image data. However, when the above method is applied to image data which is being sensed by an image sensing apparatus, key frames often concentrate on a specific portion. For example, when the user slowly pans a camera, the degree of change in image is small (i.e., the inter-frame differences are small). Hence, an appropriate division point cannot be found from that degree of change, and it is difficult to obtain an appropriate key frame from such scene.

On the other hand, when the user pans a camera quickly, the inter-frame differences during panning depend on the monotony of a scene to be sensed. If a scene to be sensed is monotonous, a key frame cannot be obtained since the inter-frame differences are small. However, if a scene to be sensed is not monotonous, key frames locally concentrate since larger inter-frame differences are obtained.

As described above, key frames are preferably set at appropriately distributed positions in entire moving image data. For this purpose, it is required to divide moving image data at appropriate positions so as to set key frames.

SUMMARY OF THE INVENTION

The present invention has been conceived in light of the foregoing considerations.

According to one aspect of the present invention, preferably, an image processing apparatus comprising: imaging means for imaging an object and obtaining moving image data composed of a plurality of frames; storing means for storing additional information indicating contents of events that occurred during the imaging of the moving image data by the imaging means into a storage; dividing means for dividing the moving image data for one shot into a plurality of sub-shots based on the events indicated by the additional information stored in the storage; and selecting means for selecting a key frame from the moving image data of each sub-shot divided by the dividing means in accordance with the additional information.

Other features and advantages of the present invention will be apparent from the following descriptions taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the descriptions, serve to explain the principle of the invention.

FIG. 3 shows an example of the structure of image sensing environment data in the embodiment;

FIG. 4 shows an example of the structure of action information in the embodiment;

FIG. 5 shows an example of the structure of sub-shot information in the embodiment;

DETAILED DESCRIPTION OF THE PREFERRED EMBODIMENTS

Preferred embodiments of the present invention are described in detail in accordance with the accompanying drawings.

Terms used in the following description will be defined first. "Shot" means moving image data acquired from the beginning to the end of video recording. "Sub-shot" means moving image data of each period when a shot is divided into a plurality of periods in accordance with given rules. "Key frames" mean a plurality of image frames which represent a given moving image period in that moving image period.

First Embodiment

Figure 1:
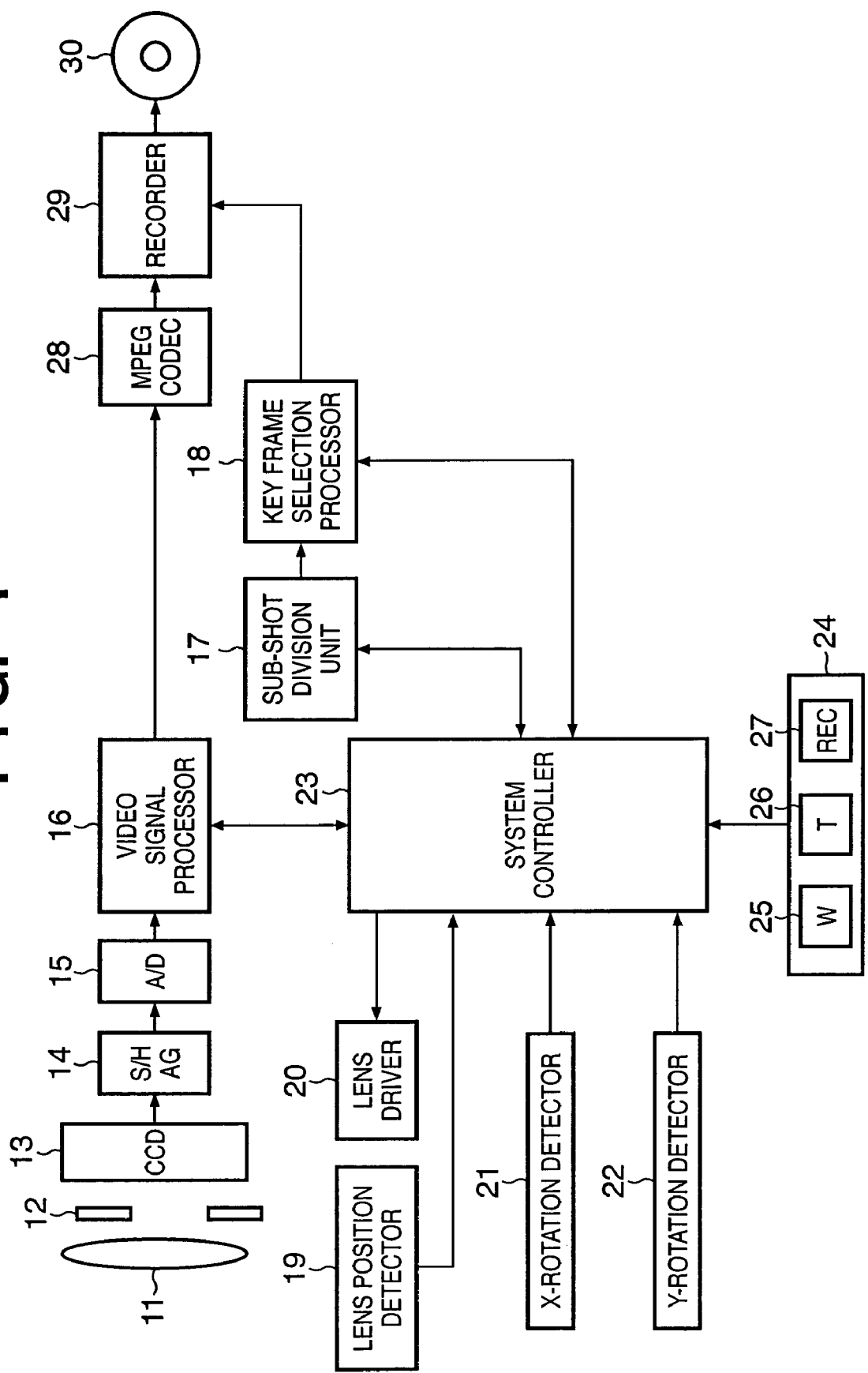
FIG. 1 is a block diagram showing the arrangement of an image sensing apparatus according to an embodiment of the present invention.

FIG. 1 is a block diagram showing the arrangement of an image sensing apparatus as an image processing apparatus of this embodiment.

Referring to FIG. 1, reference numeral 11 denotes a zoom lens for forming an object image; 12, an aperture for adjusting the amount of light; 13, an image sensing element which comprises a CCD for converting input light into an electrical signal; and 14, a sample and hold AGC circuit for making a sample an hold process and gain adjustment. Reference numeral 15 denotes an analog-to-digital (A/D) converter for making A/D conversion; and 16, a video signal processor for generating a video signal by processing a signal. Reference numeral 17 denotes a sub-shot division unit for dividing a video signal into sub-shots. Reference numeral 18 denotes a key frame selection processor for selecting a key frame from each sub-shot. Reference numeral 19 denotes a lens position detector for detecting the position of the lens; and 20, a lens driver for driving the lens. Reference numeral 21 denotes an X-rotation detector for detecting rotation of the image sensing apparatus in the horizontal direction (X-direction). The detector 21 detects rotation using a gyro sensor or acceleration sensor, and executes signal processes using a bandpass filter and the like. The detector 21 then A/D-converts the processed signal and outputs digital data. Each rotation detector is conventionally equipped in the image sensing apparatus for the purpose of blur prevention of a video signal. In such case, each rotation detector may be commonly used. Reference numeral 22 denotes a Y-rotation detector for detecting rotation of the image sensing apparatus in the vertical direction (Y-direction). The arrangement of the detector 22 is the same as that of the X-rotation detector. Reference numeral 23 denotes a system controller for controlling the overall image sensing apparatus.

Reference numeral 24 denotes an operating panel on which keys used to operate the zoom lens and to start/end video recording are arranged. Reference numeral 25 denotes a wide key used to shift the zoom lens in a wide (wide angle=image reduction) direction; and 26, a tele key used to shift the zoom lens in a tele (telephoto=image enlargement) direction. The wide key 25 and tele key 26 form a see-saw type interlocked key, and output an output signal indicating a pressed one of these keys and its pressing level to the system controller 23. Reference numeral 27 denotes a REC key used to instruct the start/end of video recording. This key is of toggle type, and instructs the end of video recording if it is pressed during video recording, or the start of video recording if it is pressed during a non-recording state. Reference numeral 28 denotes an MPEG CODEC for encoding video data by MPEG. Reference numeral 29 denotes a recorder which comprises a drive for recording a recording medium and recording information and the like. Reference numeral 30 denotes a recording medium, which may use an optical disk, magnetic disk, magnetooptical disk, magnetic tape, hard disk, nonvolatile memory, nonvolatile memory card, or the like.

Figure 2:
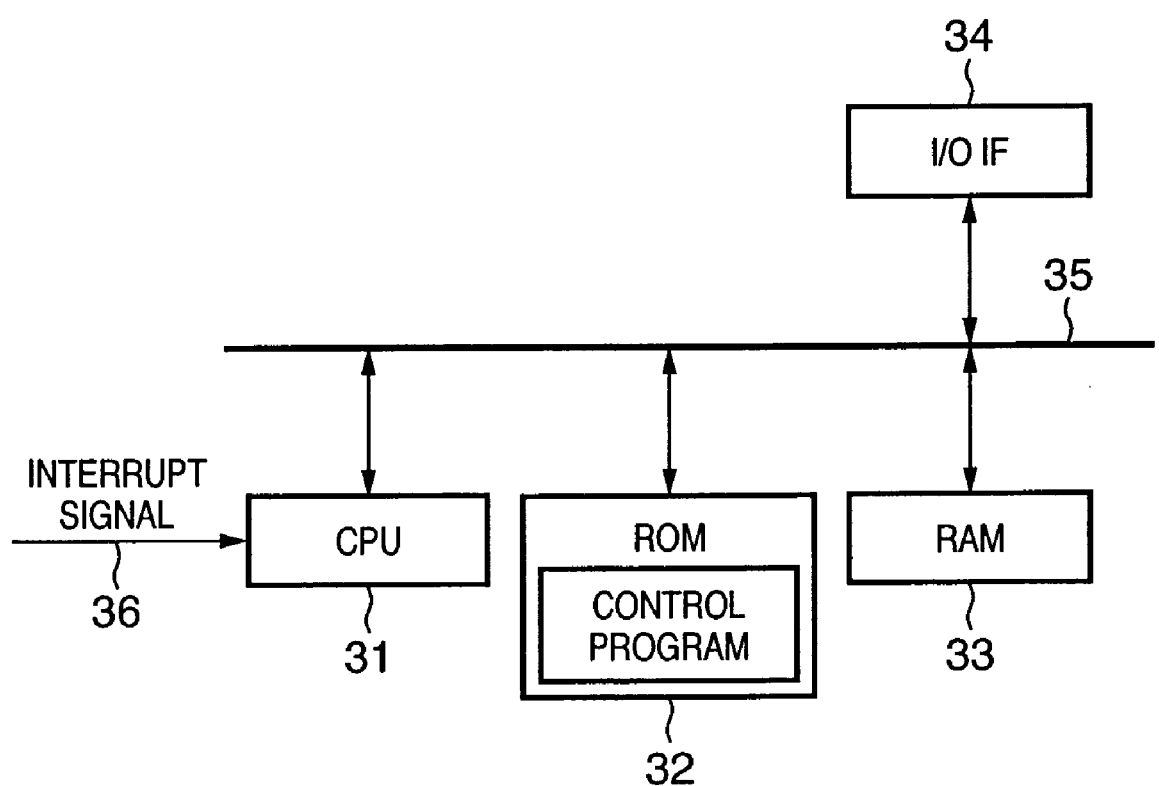
FIG. 2 is a block diagram showing the arrangement of a system controller in the embodiment.

FIG. 2 is a block diagram showing the arrangement of the system controller 23. The system controller 23 has a CPU 31, ROM 32, RAM 33, I/O interface 34, bus 35, and interrupt signal line 36. The ROM 32 stores programs to be executed by the CPU 31, table values, and the like.

The operations of respective blocks in this embodiment will be described below.

The amount of light that comes from an object and received by the zoom lens 11 is adjusted by the aperture 12, and that light forms an image on the surface of the image sensing element 13. The image sensing element 13 converts the optical image into an electrical signal, which is A/D converted by the A/D converter 15 via the sample and hold AGC circuit 14. The digital signal is then input to the video signal processor 16.

In the video signal processor 16, the input signal undergoes processes such as aperture correction, gamma correction, white balance correction, digital zoom, and the like to generate a video signal, which is output to the sub-shot division unit 17.

Rotation signals of the image sensing apparatus, which are obtained from the X- and Y-rotation detectors 21 and 22 are detected by the system controller 23 as pan (horizontal rotation of a camera) information and tilt (vertical rotation of the camera) information. Image sensing environment information based on such pan and tilt information and action information from the operating panel 24 are output to the sub-shot division unit 17.

The sub-shot division unit 17 divides the video signal (shot) from the beginning to the end of video recording into a plurality of periods on the basis of the input information, and outputs the input information appended with sub-shot period information to the key frame selection processor 18.

The key frame selection processor 18 selects a frame that appropriately represents each period as a key frame from each sub-shot period on the basis of the input information, and outputs the input information appended with information associated with selected key frames to the MPEG CODEC 28.

The MPEG CODEC 28 encodes the input video signal. At this time, the MPEG CODEC 28 stores the image sensing environment information, action information, sub-shot division information, and key frame information input from the key frame selection processor 18 together with the encoded video signal, and outputs them to the recorder 29 connected to it. The storage method of the image sensing environment information, action information, sub-shot division information, and key frame information will be described later.

The recorder 29 creates one file per shot on the recording medium 30. Of course, one shot may be saved using a plurality of files or a plurality of shots may be saved using one file. Also, digital information may be stored by a method independently of a file system, as long as it can be read out.

The system controller 23 starts/ends video recording on the basis of an operation input of the REC key 27. The system controller 23 controls the lens driver 20 or digital zoom of the video signal processor 16 on the basis of an operation input of the wide key 25 and tele key 26. At this time, the controller 23 changes a zoom magnification at higher speed with increasing pressing level. Note that a function of enlarging an image to be sensed by a lens optical system is called an optical zoom mode, and a function of enlarging an image in the vertical and horizontal directions by a digital signal process without the lens optical system is called a digital zoom mode. The system controller 23 determines a zoom magnification in the optical zoom mode on the basis of a lens position detection signal from the lens position detector 19. The system controller 23 controls the processes in the sub-shot division unit 17 and key frame selection processor 18. The system controller 23 removes signal components caused by camera shake from rotation information output from the X- and Y-rotation detectors 21 and 22 to detect pan or tilt information by a user's operation, and outputs the detected information to the sub-shot division unit 17. In addition, the system controller 23 controls the required blocks of the image sensing apparatus.

According to this embodiment with the above arrangement, a moving image as one shot obtained by image sensing is divided into sub-shots on the basis of an event that has occurred during image sensing. The event that has occurred during image sensing includes, e.g., action information and image sensing environment information of the image sensing apparatus. After that, using the action information and image sensing environment information of the image sensing apparatus, a key frame is selected from each divided sub-shot period.

As typical action information of the image sensing apparatus, information associated with a zoom action of the image sensing apparatus is available. An image at the zoom start position is normally largely different from that at the zoom end position, and it is reasonable to determine a period corresponding to this action as one sub-shot period. In addition, this information can be easily acquired in the form of an action information history.

As typical image sensing environment information, rotation information upon panning a camera as one of camera motions is available. As for panning of a camera, an image at the pan start position is normally largely different from that at the pan end position, and it is reasonable to determine a period corresponding to this action as one sub-shot period. In addition, this pan information can be acquired from a gyro sensor for blur prevention or the like, which is equipped in recent camcorders. In this way, a sub-shot division process can be implemented with low cost without any special image process.

By selecting a key frame from each of divided periods, upon selecting a plurality of key frames from one shot, key frames can be selected from distributed times in place of being selected together from a given portion.

A method of recording additional information such as action information, image sensing environment information, and the like together with a moving image will be described below. As this method, a method of storing such information in an unused area or the like in management information of image data for respective frames is available. More specifically, for example, in case of an MPEG-2 stream, a method of storing additional information in a user data area in a picture header or that in a GOP header is available. Also, information generated as a result of arithmetic operations after image sensing may be added as a footer to the end of a moving image file. For example, in case of an MPEG-2 transport stream, additional information may be stored in a private PES packet, and may be additionally written to the end of a file as a TS packet. Also, a method of storing a moving image and additional information in different files is available. In this case, in order to determine correspondence between a moving image and additional information, a file name generation rule may be set to uniquely determine a moving image file name and additional information file name, or reference information may be stored to form a hyperlink.

In this embodiment, the pan detection result is recorded. Alternatively, information obtained by quantizing raw information such as an acceleration sensor output signal or the like before pan detection, or information obtained by quantizing signal processing results executed in respective stages before pan detection may be stored. If such raw information is stored, even when a real-time process is hard to attain in terms of the processing load on a camcorder main body, a post-process in the camcorder main body or an external device can generate and record pan information and zoom information as action information and image sensing environment information. Using such raw information, expandability can be assured, i.e., pan detection may be made using pan detection means with higher precision in the future.

Details of additional information will be described below using FIGS. 3 to 5. The data structure shown in each of FIGS. 3 to 5 is that for one data element. If there are a plurality of data, a list that can access respective elements is formed. In this embodiment, each data is expressed by bits. However, a text format, e.g., unique DTD (Document Type Definition) may be defined, and data may be expressed using XML (Extensible Markup Language), as long as the system controller 23 can control. If data is stored in a format according to MPEG-7, it may be stored in Segment DS.

An example of the structure of image sensing environment data in this embodiment will be described first using FIG. 3.

As shown in FIG. 3, image sensing environment information contains n image sensing environment information segments, i.e., image sensing environment information 1, image sensing environment information 2, . . . , image sensing environment information n as additional information of corresponding frames. Each image sensing environment information segment has a "Time" field, "DataType" field, "Speed" field, and "Direction" field.

"Time" describes time information with reference to the playback time period of a moving image file when an image sensing environment has changed. If the image sensing environment information is stored in the user data area of the picture header, this field can be omitted since information is redundant. An offset position on a file of the picture header corresponding to each time may be recorded as long as the location of an image in a moving image file can be easily specified.

"DataType" describes data indicating the type of image sensing environment information. The type of image sensing environment information includes, e.g., pan start, pan continuation, pan end, tilt start, tilt continuation, and tilt end. Pan or tilt continuation is used when the speed or direction has changed.

"Speed" is available when DataType=pan start, pan continuation, tilt start, or tilt continuation, and represents the pan or tilt rotation speed. In this embodiment, the speed is described in seven levels from 1 (lowest speed) to 7 (highest speed).

"Direction" is available when DataType=pan start, pan continuation, tilt start, or tilt continuation, and represents the pan or tilt direction. In this embodiment, in case of pan, 1 indicates the right direction, and 0 indicates the left direction. In case of tilt, 1 indicates the up direction, and 0 indicates the down direction.

An example of the structure of action information in this embodiment will be described below using FIG. 4.

As shown in FIG. 4, action information contains n action information segments, i.e., action information 1, action information 2, . . . , action information n as additional information of corresponding frames. Each action information segment has a "Time" field, "DataType" field, "Speed" field, "Direction" field, and "Magnification" field.

"Time" describes time information with reference to the playback time period of a moving image file when an image sensing environment has changed. If the action information is stored in the user data area of the picture header, this field can be omitted since information is redundant. An offset position on a file of the picture header corresponding to each time may be recorded as long as the location of an image in a moving image file can be easily specified.

"DataType" describes data indicating the type of action information. The type of action information includes, e.g., zoom start, zoom continuation, zoom end, video recording start, video recording end, and the like. Zoom continuation is used when the speed has changed.

"Speed" is available when DataType=zoom start or zoom continuation, and represents the zoom change speed. In this embodiment, the speed is described in seven levels from 1 (lowest speed) to 7 (highest speed).

"Direction" is available when DataType=zoom start or zoom continuation, and represents the zoom direction: 1 indicates the tele side, and 0 indicates the wide side.

"Magnification" is available when DataType=zoom start or zoom continuation, and represents the zoom magnification. The zoom magnification is described in 32 levels from 0 (most tele side) to 31 (most wide side).

An example of the structure of sub-shot information in this embodiment will be described below using FIG. 5.

As shown in FIG. 5, sub-shot information contains n sub-shot information segments, i.e., sub-shot information 1, sub-shot information 2, . . . , sub-shot information n as additional information of corresponding frames. Each sub-shot information segment has a "StartTime" field, "EndTime" field, "NumberOfKeyFrames" field, and "KeyFrame" field.

"StartTime" represents a sub-shot start time, and describes time information with reference to a playback time period of a moving image file.

"EndTime" represents a sub-shot end time, and describes time information with reference to the playback time period of a moving image file.

"NumberOfKeyFrames" describes the number of key frames in a moving image period specified by StartTime and EndTime.

"KeyFrame" describes time information with reference to the playback time period of a moving image file of each frame serving as a key frame in correspondence with the number indicated by NumberOfKeyFrames.

Figure 6:
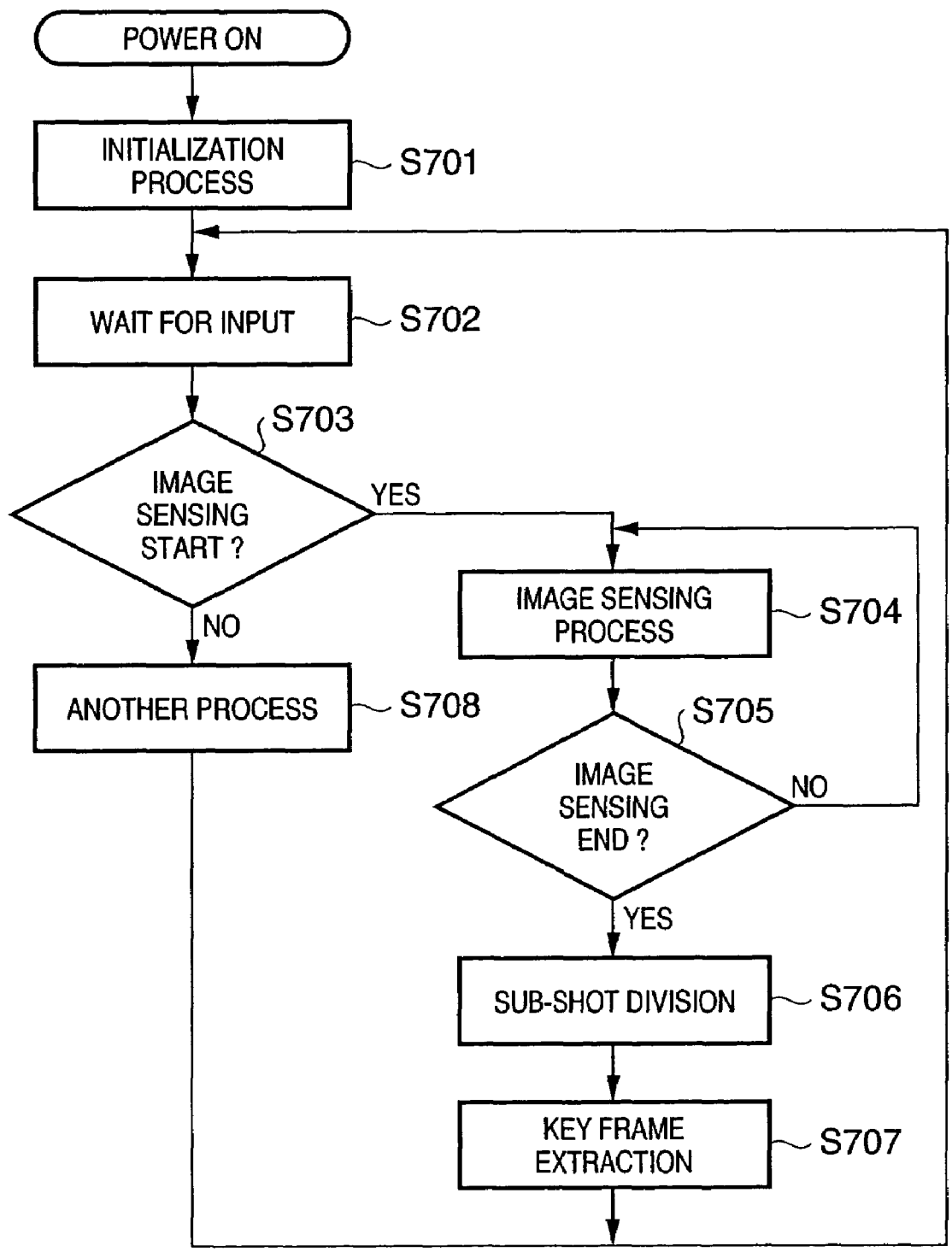
FIG. 6 is a flow chart showing an outline of the operation of the image sensing apparatus according to the first embodiment.

An outline of the operation of the image sensing apparatus of this embodiment will be described below using the flow chart shown in FIG. 6. A program corresponding to this flow chart is included in control programs stored in the ROM 32 in the system controller 23. This program is loaded onto the RAM 33 and is executed by the CPU 31 after power ON.

When the power switch of the image sensing apparatus is turned on, an initialization process of the image sensing apparatus is executed (step S701). The flow advances to step S702 to wait for an input from the operating panel 24. If some input is detected, the flow advances to step S703. If the input is that of the REC button 27, the flow advances to step S704 to execute an image sensing process. At this time, action information and image sensing environment information are temporarily stored in the RAM 33 as an image sensing environment information list for post-processes in a time-series order in addition to outputs to the recorder 29. It is checked in step S705 if the image sensing process is complete, and the image sensing process in step S704 continues until it is determined that the image sensing process is complete. The image sensing process is complete when one of the following conditions are satisfied: the user has pressed the REC button 27, the recording medium 30 has become full of data, power supply will stop soon, and so forth.

Upon completion of the image sensing process, the flow advances to step S706 to execute a sub-shot division process. The flow then advances to step S707 to execute a key frame extraction process. The flow returns to step S702 to wait for the next input. If an input other than the image sensing start input (e.g., mode setup input) is detected in step S703, the flow advances to step S708 to execute another process corresponding to that input. After that, the flow returns to step S702 to wait for the next input.

If an interrupt has been generated by the interrupt signal 36, this process is aborted, and a required interrupt process is executed.

Figure 7:
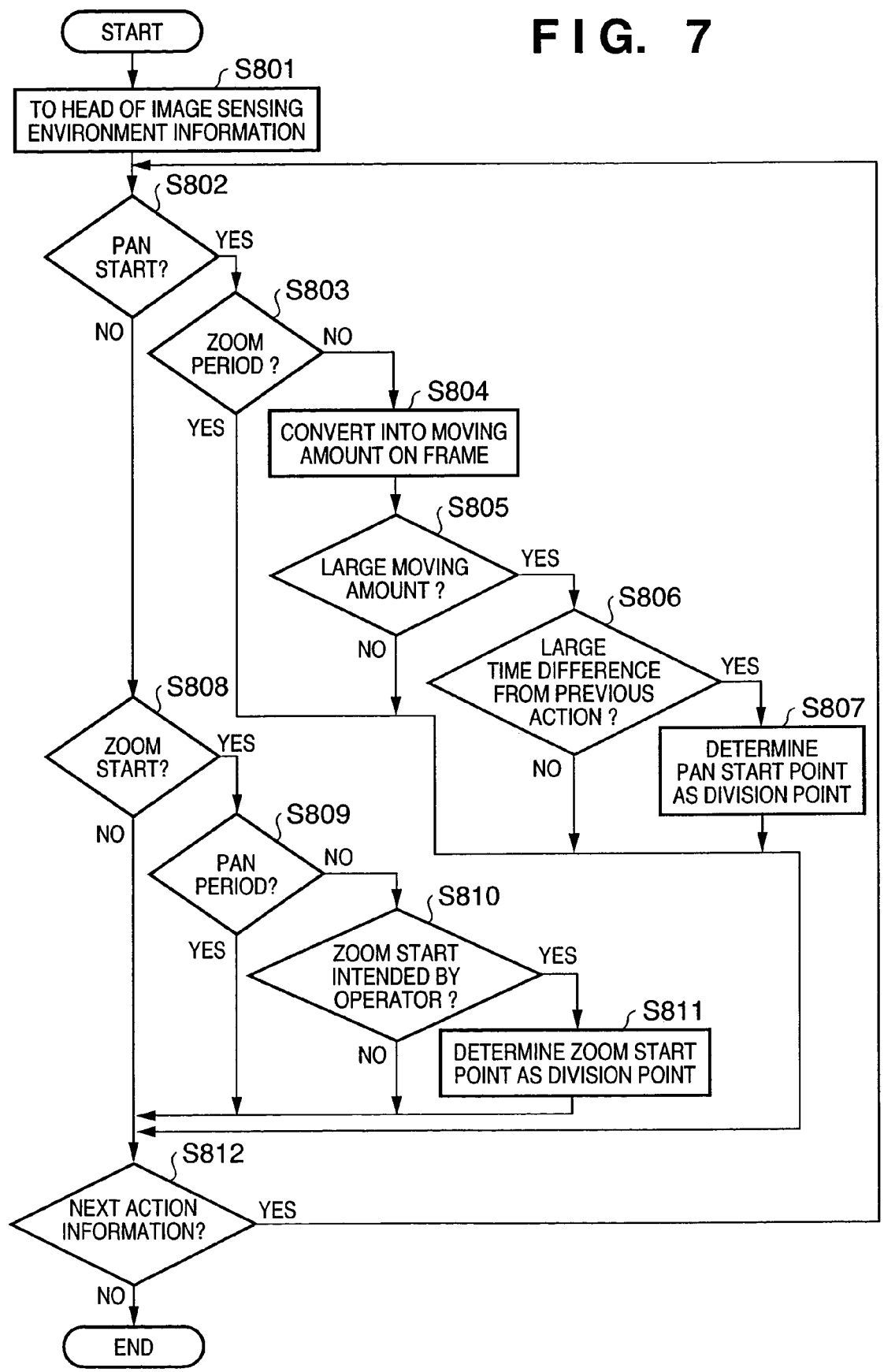
FIG. 7 is a flow chart showing details of a sub-shot division process.

FIG. 7 is a flow chart showing details of the sub-shot division process in step S706 above.

In step S801, a pointer is set at the head of the image sensing environment information list stored in the RAM 33 during the image sensing process. The flow advances to step S802 to evaluate if the type of information in the image sensing environment information list is pan start. If the type of information is pan start, the flow advances to step S803 to evaluate if the information indicates a zoom period. That is, when a plurality of events have occurred at the same time (e.g., when a zoom event starts during a pan event), a sub-shot to be divided is determined focusing on the event which has occurred first. Such process can be implemented by referring to elements before and after the currently processed pointer in the image sensing environment information list. If it is determined as a result of evaluation in step S803 that the information does not indicate a zoom period, the flow advances to step S804 to convert the rotation angle into a moving amount on a frame. Even when the rotation angle of the image sensing apparatus remains the same, if zooming is made at the same time, the motion on the frame becomes larger. Hence, conversion is made by multiplying the rotation angle by a coefficient determined for each zoom position. This process is repeated with reference to elements after the currently processed pointer in the image sensing environment information list to calculate the total moving amount during the entire pan period until the end of the pan event.

The flow advances to step S805 to evaluate if the moving amount on the frame calculated in step S804 is larger than a threshold value. If the moving amount is larger than the threshold value, the flow advances to step S806. In step S806, a time difference from the end of the previous pan action is evaluated. This is to exclude an action made at a high frequency of occurrence from a sub-shot candidate. If the time difference is larger than a threshold value in step S806, the flow advances to step S807. In step S807, the pan start point is determined as a division point.

If it is determined as a result of evaluation in step S802 that the type in the list is not pan start, the flow advances to step S808 to evaluate if the type in the list is zoom start. If the type in the list is zoom start, the flow advances to step S809 to evaluate if the information indicates a pan period. This evaluation is made for the same reason as that of the zoom period during the pan action. If it is determined as a result of evaluation in step S809 that the information does not indicate a pan period, the flow advances to step S810. It is estimated in step S810 if the operator intended a single zoom action even when he or she made a plurality of zoom actions. For example, as distinctive actions of a beginner, he or she cannot stop the operation of the zoom button 25 or 26 at a zoom magnification that he or she intended, and makes another zoom action in the reverse direction to correct the result of the former action. In this case, such actions are estimated. This estimation can be attained since a time period from the end of a zoom action to the beginning of another zoom action falls within a predetermined range, the zoom action is made at a high speed, and the zoom direction is reversed. Also, as distinctive actions of a beginner, he or she cannot make a smooth zoom action, and intermittently makes zoom actions. Such actions can be estimated on the basis of the time difference and zoom directions. In this case, a continuous zoom period is determined. If it is determined as a result of this evaluation that the action was intended by the user, the flow advances to step S811; otherwise, the flow advances to step S812. In step S811, the zoom start point is determined as a division point. Upon completion of the process for the current pointer in the image sensing environment information list, the flow advances to step S812 to advance the pointer position. If the next action information is available, the flow returns to step S802 to repeat the above processes. If no action information to be processed remains, this process ends.

Figure 8:
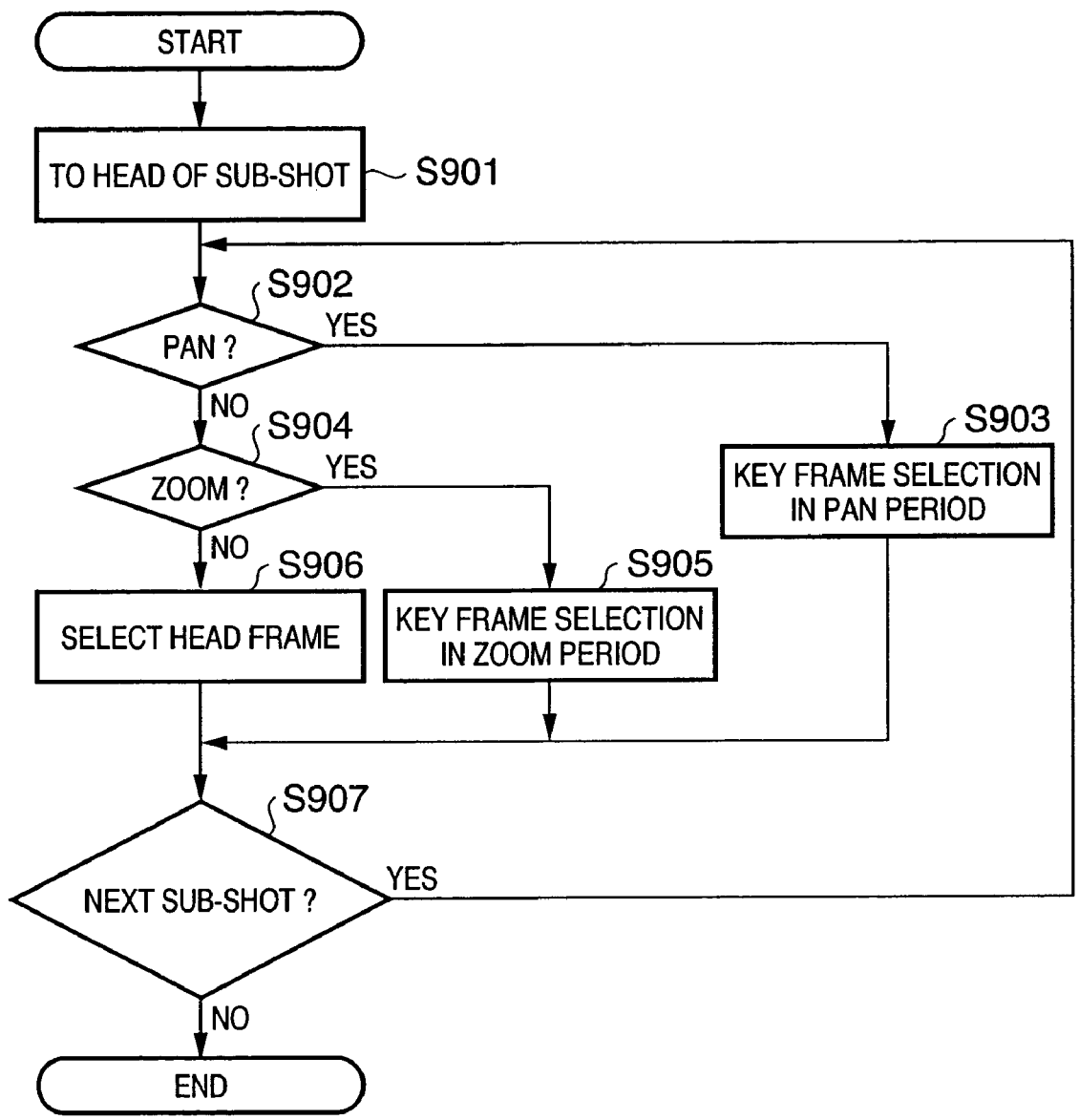
FIG. 8 is a flow chart showing details of a key frame extraction process.

FIG. 8 is a flow chart showing details of the key frame extraction process in step S707.

In step S901, a pointer is set at the head of a sub-shot information list. The flow advances to step S902 to check with reference to the image sensing environment information list if the head of a sub-shot corresponds to the start of a pan action. In case of a sub-shot divided by the pan action, the flow advances to step S903 to select a key frame during the pan period. Details of this process will be described later. If it is determined as a result of evaluation in step S902, the head of a sub-shot does not correspond to the start of a pan action, the flow advances to step S904 to check if the head of a sub-shot corresponds to the start of a zoom action. In case of a sub-shot divided by the zoom action, the flow advances to step S905 to select a key frame during the zoom period. Details of this process will be described later. If it is determined as a result of evaluation in step S904 that the head of a sub-shot does not correspond to the start of a zoom action, the flow advances to step S906 to select the head frame as a key frame. Upon completion of the process for the current pointer in the sub-shot information list, the flow advances to step S907 to advance the pointer position. If the next sub-shot is available, the flow returns to step S902 to repeat the above processes. If no sub-shot to be processed remains, this process ends.

Figure 9:
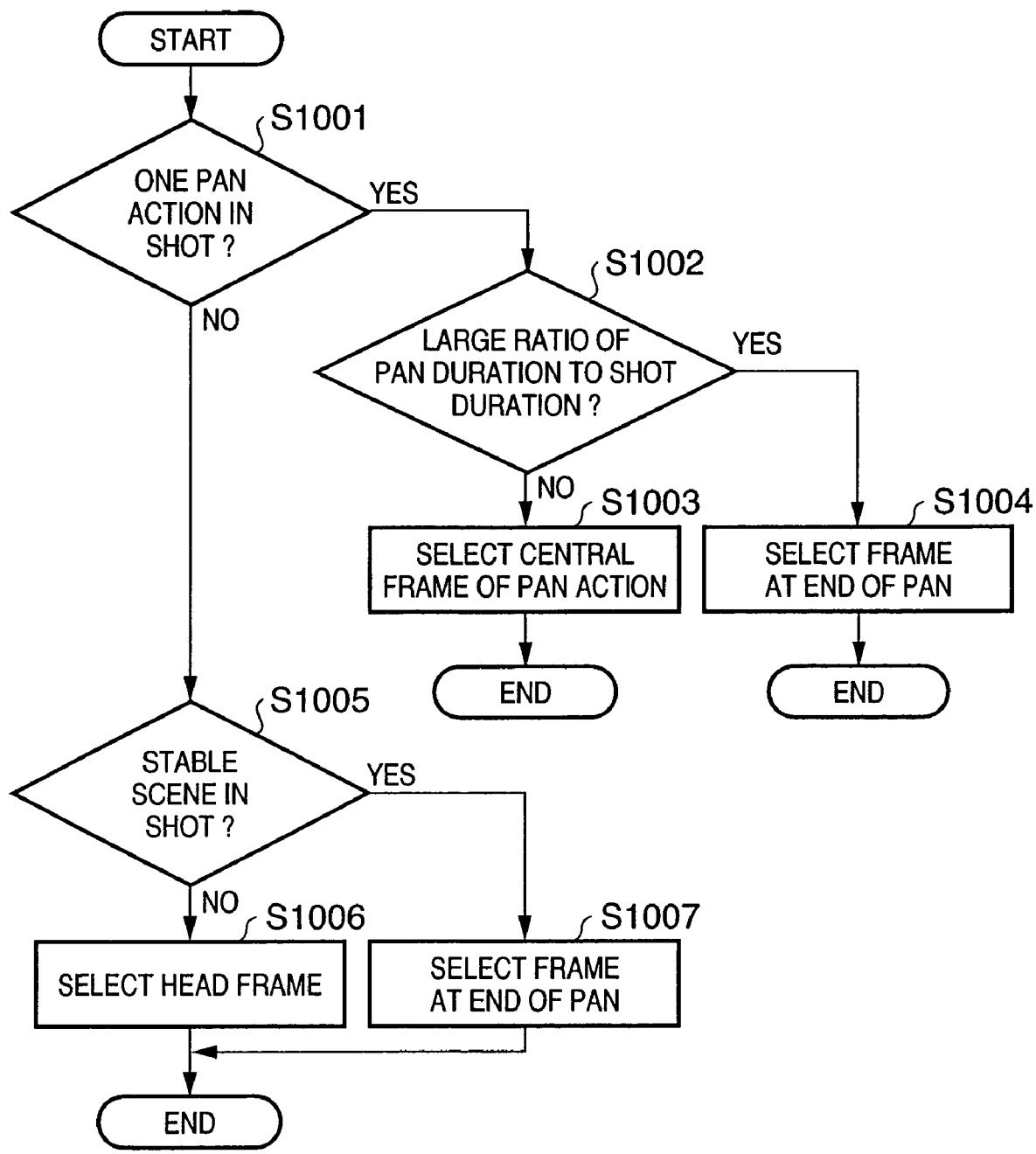
FIG. 9 is a flow chart showing details of a frame selection process in a pan period.

FIG. 9 is a flow chart showing details of the key frame selection process during the pan period in step S903.

It is evaluated with reference to the image sensing environment information list in step S1001 if a pan action is made once in a shot. If the pan action is made once, the flow advances to step S1002 to evaluate if the pan action occupies a relatively long duration in the shot. For example, the ratio of a time period until the end of the pan action to the shot duration is calculated with reference to the image sensing environment information list, and it is evaluated if that ratio is larger than a threshold value. If the pan action occupies a relatively long duration in the shot, it is estimated that the operator took that shot to record where he or she was. For example, such action is made when the operator takes a shot of a landscape or overview inside a given site. In this case, since an image during the pan action is often more significant than that at the end of the pan action, the flow advances to step S1003 to select a central frame during the pan action period as a key frame, thus ending the process. If it is determined in step S1002 that the ratio of the pan duration to the shot duration is smaller than the threshold value, since an image that the operator intended often appears at the end of the pan period, the flow advances to step S1004 to select the last frame during the pan action period as a key frame, thus ending the process.

If it is determined as a result of evaluation in step S1001 that a plurality of pan actions are made in a shot, the flow advances to step S1005 to evaluate if the shot includes a stable scene. For example, the ratio of the total of all pan action times in the shot to the shot duration is calculated with reference to the image sensing environment information list, and it is evaluated if this ratio exceeds a threshold value. If the ratio of the pan actions to the shot exceeds the threshold value, it is estimated that the operator took that shot in an unstable state or could not predict the motion of an object since it moved rapidly. In such case, the flow advances to step S1006 to select the head frame as a key frame, thus ending the process. On the other hand, if it is determined as a result of evaluation in step S1005 that a stable scene is found, the flow advances to step S1007 to select a frame at the end of the pan action as a key frame, thus ending the process.

Figure 10:
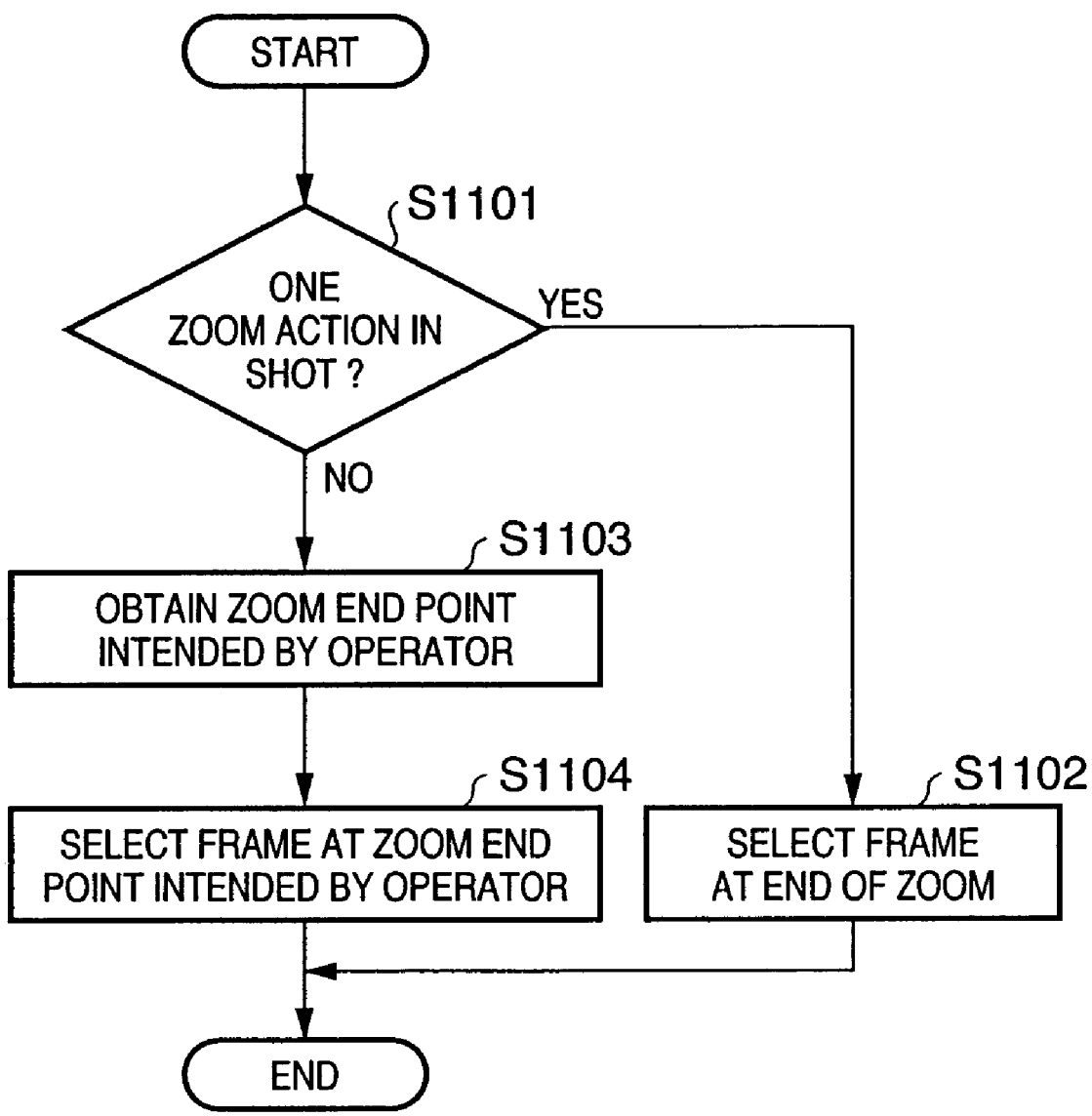
FIG. 10 is a flow chart showing details of a frame selection process in a zoom period.

FIG. 10 is a flow chart showing details of the key frame selection process during the zoom period in step S905.

It is evaluated with reference to the image sensing environment information list in step S1101 if a zoom action is made once in a shot. If the zoom action is made once, the flow advances to step S1102 to select the last frame of the zoom action period as a key frame, thus ending the process. If it is determined in step S1101 that a plurality of zoom actions are made, the flow advances to step S1103 to obtain a zoom end point that the operator intended with reference to a last part of the image sensing environment information list. A method of evaluating the zoom end point that the operator intended is the same as that in step S810 that has been explained in the sub-shot division process. The flow advances to step S1104 to select the last frame of the zoom action period that the operator intended, which is obtained in step S1103, as a key frame, thus ending the process.

According to the embodiment described above, moving image data as one shot obtained by image sensing is divided into sub-shots at positions according to the contents of events that occurred during image sensing. The contents of events that occurred during image sensing include, for example, action information (zoom action and the like) and/or image sensing environment information (rotation information of a pan action) of the image sensing apparatus. For this reason, image data can be divided at more appropriate positions than in a case wherein image data is simply divided on the basis of difference values between neighboring image frames.

Furthermore, since key frames are selected from respective sub-shot periods using the action information and image sensing environment information of the image sensing apparatus after the division process, key frames can be set at appropriately distributed positions without being concentrated locally in moving image data.

According to the aforementioned embodiment, the key frame position in each sub-shot is determined in different sequences depending on whether that sub-shot is divided based on the pan action or zoom action. For example, if that sub-shot is divided based on the zoom action, a frame at the end of the zoom action is typically selected as a key frame; if that sub-shot is divided based on the pan action, one of a central frame during the pan action and a frame at the end of the pan action is typically selected as a key frame in accordance with the ratio of the pan action time to that shot. With this process, key frames according to the operator's purpose can be selected with higher precision.

In this embodiment, a frame number with reference to the playback time of a moving image file is adopted as a time unit of image sensing environment information and action information. However, any other units may be used as long as they are synchronized with video and audio data. In this embodiment, each key frame is specified by a frame number. However, any other units may be used as long as they can specify frames. Image data itself of a key frame or that which has undergone an image process such as reduction or the like may be described, or an image may be generated on an independent area, and pointer information or a hyperlink to that image may be described.

This embodiment is implemented using a single apparatus. Alternatively, a plurality of apparatuses may form a network using communication means such as a serial interface, e.g., USB2.0 or the like, IEEE1394, a wireless LAN, and the like, and the same functions may be implemented.

The present invention is not limited to the sub-shot division process and key frame extraction process which are made after the end of video recording in the image sensing apparatus. For example, information on a recording medium may be transferred to another apparatus such as a personal computer or the like, and the same processes as those described above may be executed on the personal computer to process additional information.

In this embodiment, image sensing environment information is acquired from the rotation detection means of the apparatus. However, if the criterion upon selecting a key frame changes depending on the type of image sensing environment information, the present invention is not limited to such specific information, and position information measured by a GPS and the like, the outputs from measuring instruments such as a thermometer, altimeter, compass, aerotonometer, and the like, and living body information such as the posture, pupil size, skin resilience, pulse, brain wave, and the like of the operator may be used.

In this embodiment, one key frame is selected from each sub-shot. However, the number of key frames to be selected is not limited to one, and a plurality of key frames may be selected. If no frame suited to a key frame is found, selection may be skipped.

Second Embodiment

In the first embodiment described above, the X- and Y-rotation detectors 21 and 22 are provided for the purpose of acquiring pan information and tilt information. Such rotation detectors are equipped for the purpose of image blur prevention in the conventional image sensing apparatus, and may be commonly used in such case, as described above.

However, such common use poses another problem. That is, camera shake has a frequency range around 10 Hz, and pan and tilt actions have a frequency range around 1 Hz or less, i.e., the frequency ranges to be detected are different. For this reason, when conventional rotation detectors which are provided for the purpose of camera shake prevention are also used to detect pan information and tilt information, it is difficult to improve their detection precision. For example, when the operator takes a shot while he or she is walking, vibrations produced step by step are erroneously detected as tilt information. When the sub-shot division process is done using such information, a large number of sub-shots are undesirably formed.

Hence, this embodiment suppresses the number of sub-shots from increasing by excessively dividing a shot.

Since the arrangement of an image sensing apparatus as an image processing apparatus according to this embodiment is the same as that shown in FIGS. 1 and 2, a description thereof will be omitted. Also, the structures of image sensing environment information, action information, and sub-shot information used in this embodiment are the same as those shown in FIGS. 3, 4, and 5.

Figure 11:
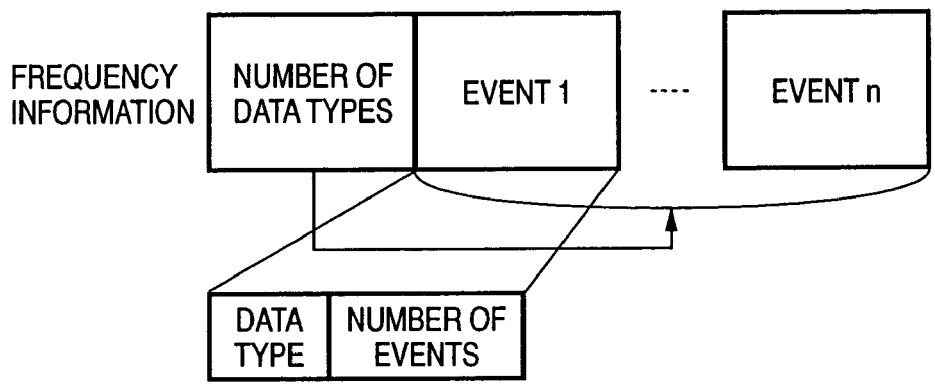
FIG. 11 shows an example of the structure of event frequency information according to the second embodiment of the present invention.

In this embodiment, event frequency information shown in FIG. 11 is used in addition to these pieces of information. As shown in FIG. 11, event frequency information is made up of a "NumberOfDataTypes" field which describes the number of event types associated with following actions and image sensing environments, and event data fields corresponding to the number (n) described in that NumberOfDataTypes field.

Each event data field contains a "DataType" field that describes an event type associated with an action and image sensing environment, and a "NumberOfEvents" field that describes the number of times of start of the event described in the DataType field.

Figure 12:
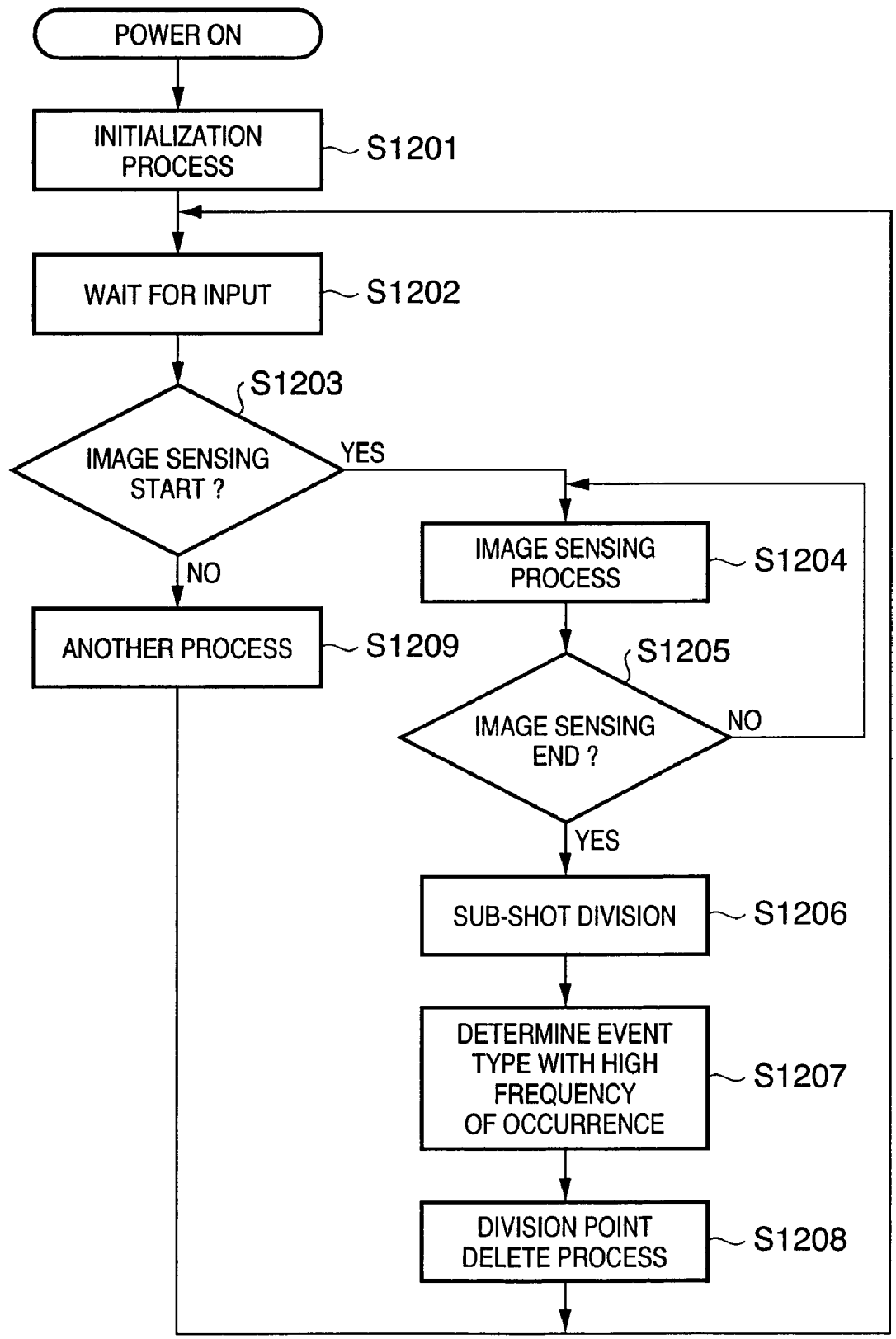
FIG. 12 is a flow chart showing an outline of the operation of the image sensing apparatus in the second embodiment.

An outline of the operation of the image sensing apparatus in this embodiment will be described below using the flow chart of FIG. 12. A program corresponding to this flow chart is included in control programs stored in the ROM 32 in the system controller 23. This program is loaded onto the RAM 33 and is executed by the CPU 31 after power ON.

When the power switch of the image sensing apparatus is turned on, an initialization process of the image sensing apparatus is executed (step S1201). The flow advances to step S1202 to wait for an input from the operating panel 24. If some input is detected, the flow advances to step S1203. If the input is that of the REC button 27, the flow advances to step S1204 to execute an image sensing process. At this time, action information and image sensing environment information are temporarily stored in the RAM 33 as an image sensing environment information list for post-processes in a time-series order in addition to outputs to the recorder 29. It is checked in step S1205 if the image sensing process is complete, and the image sensing process in step S1204 continues until it is determined that the image sensing process is complete. The image sensing process is complete when one of the following conditions are satisfied: the user has pressed the REC button 27, the recording medium 30 has become full of data, power supply will stop soon, and so forth.

Upon completion of the image sensing process, the flow advances to step S1206 to execute a sub-shot division process. The flow then advances to step S1207 to determine the type of event which occurred at a high frequency of occurrence with reference to event frequency information. The flow advances to step S1208 to delete division points determined in the sub-shot division process in step S1206 in accordance with the type of event, which is determined to be that with the high frequency of occurrence. After that, the flow returns to step S1202 to wait for the next input. If an input other than the image sensing start input (e.g., mode setup input) is detected in step S1203, the flow advances to step S1209 to execute another process corresponding to that input. After that, the flow returns to step S1202 to wait for the next input.

If an interrupt has been generated by the interrupt signal 36, this process is aborted, and a required interrupt process is executed.

The sub-shot division process in step S1206 has the same sequence as that in step S706 of the first embodiment, and is executed according to the flow chart shown in FIG. 7.

Figure 13:
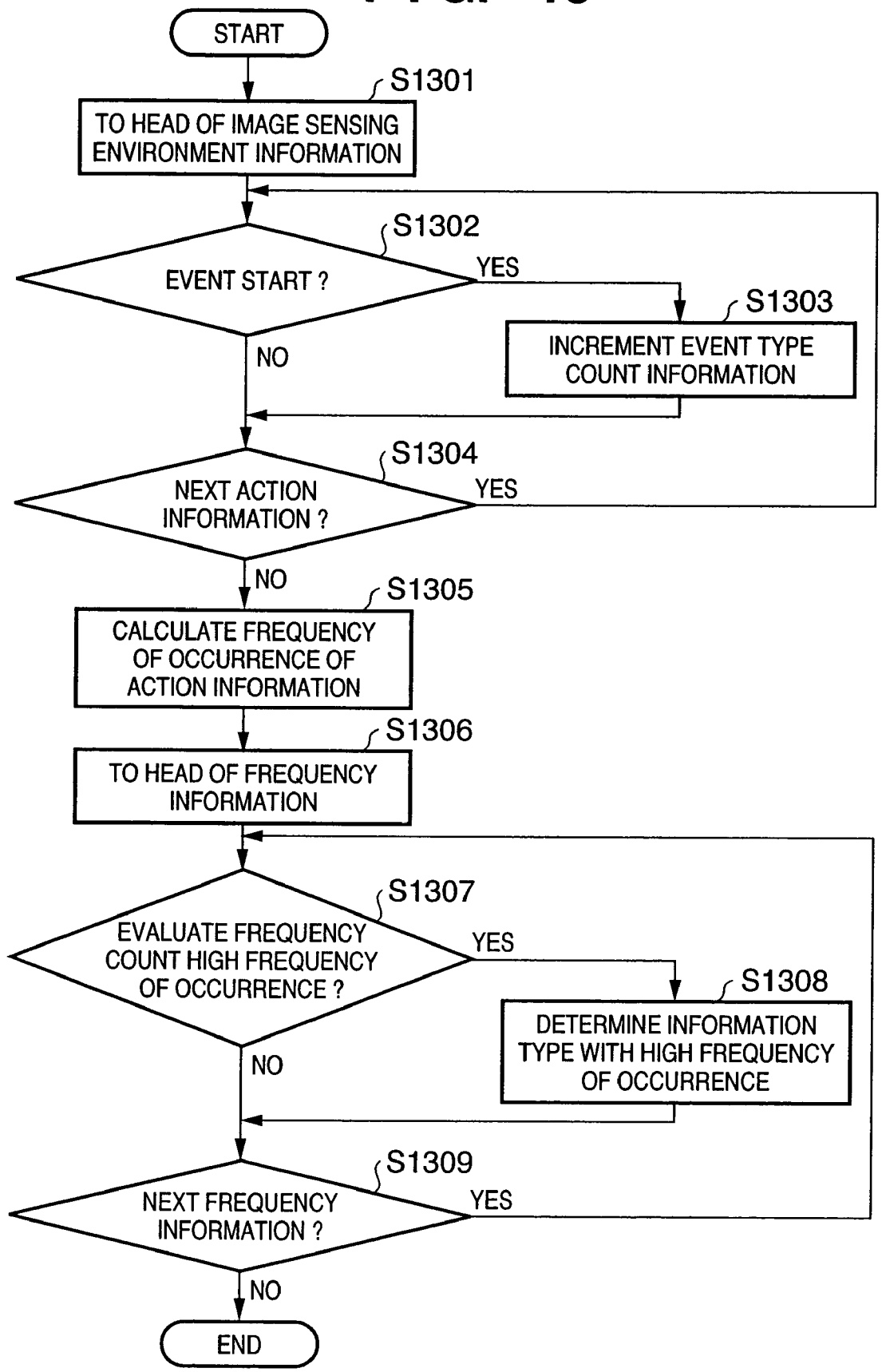
FIG. 13 is a flow chart showing details of a process for determining the type of event with a high frequency of occurrence in the second embodiment.

FIG. 13 is a flow chart showing details of a process for determining the type of event with a high frequency of occurrence in step S1207.

In this process, event frequency information is generated with reference to the action information list and image sensing environment information list, thus determining an information type with a high frequency of occurrence.

In the processes in steps S1301 to S1305, event frequency information is generated. In step S1301, a pointer is set at the head of the image sensing environment information list. The flow advances to step S1302 to evaluate if image sensing environment information at the pointer position indicates start of an arbitrary event such as a pan action, tilt action, or the like. If it is determined as a result of evaluation that an arbitrary event starts, the flow advances to step S1303 to increment count information defined for each event. The flow then advances to step S1304. On the other hand, if it is determined as a result of evaluation in step S1302 that the information does not indicate start of an event, the flow directly advances to step S1304. In step S1304, the pointer to image sensing environment information is advanced, and if the pointer has not reached the end of the image sensing environment information list, the flow returns to step S1302 to repeat the above processes. If the pointer has reached the end of the image sensing environment information list, the flow advances to step S1305 to repeat the same processes as those in step S1301 to S1304 for action information, thus calculating the frequencies of occurrence. In this manner, frequency information is generated.

An event type with a high frequency of occurrence is determined with reference to this event frequency information. In step S1306, a pointer is set at the head of the event frequency information. In step S1307, the frequency count is evaluated. In this case, the frequency count is compared with a threshold value, which is defined in advance for each event type. If YES is determined as a result of evaluation in step S1307, the flow advances to step S1308; otherwise, the flow advances to step S1309. In step S1308, that event type is determined to be that with a high frequency of occurrence, and the flow advances to step S1309. In step S1309, the pointer to the event frequency information is advanced, and if the pointer has not reached the end of the event frequency information list, the flow returns to step S1307 to repeat the above processes.

In the sequence upon selecting the event type with a high frequency of occurrence, relative evaluation may be made in place of the aforementioned absolute evaluation of the frequency of occurrence. That is, an event type with a high frequency of occurrence may be determined in turn from an event type with the largest frequency count in a given period.

Figure 14:
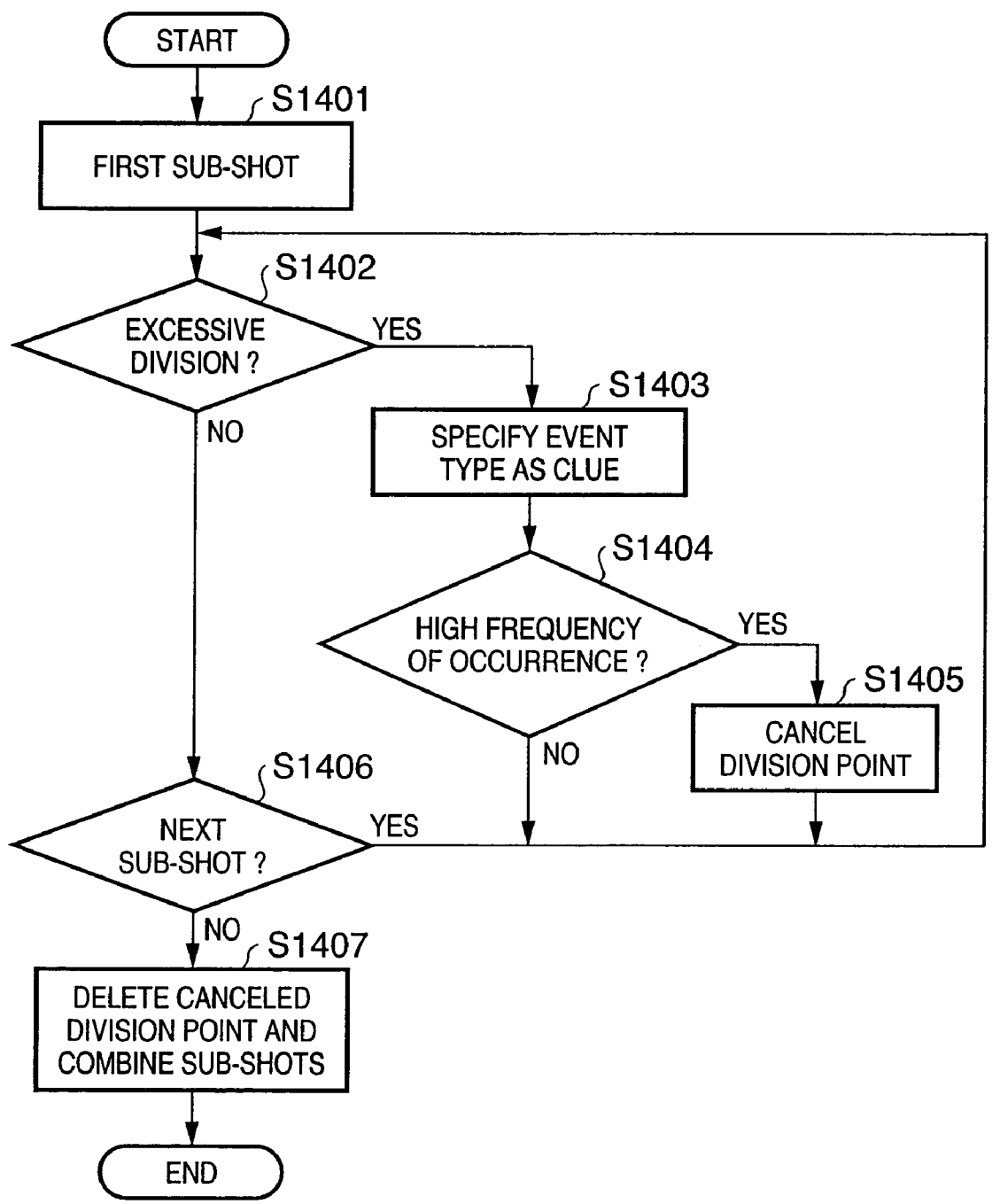
FIG. 14 is a flow chart showing details of a division point removal process in the second embodiment.

FIG. 14 is a flow chart showing details of the division point removal process in step S1208.

In step S1401, a pointer is set at the first sub-shot. The flow advances to step S1402 to check if sub-shots are formed by excessive division. If the number of divided sub-shots in a unit time including the sub-shot of interest exceeds a given density, excessive division is determined. If excessive division is determined, the flow advances to step S1403; otherwise, the flow advances to step S1406.

In step S1403, the event type as a clue of division of the sub-shot of interest is specified. In such case, an event which occurred at the same timing as the division point may be searched for, or the division points and event types as clues may be stored in the RAM 33 in correspondence with each other in the sub-shot division process. The flow advances to step S1404 to check if this event type is that with a high frequency of occurrence. If the event type is that with a high frequency of occurrence, the flow advances to step S1405, and the corresponding division point is canceled. In this case, sub-shots are combined after all sub-shots are processed, so as not to influence the excessive division determination process in step S1402.

The flow then advances to step S1406. If the sub-shot of interest is the last one, the flow advances to step S1407; otherwise, the flow returns to step S1402 to process the next sub-shot. Upon completion of the processes for all sub-shots, the flow advances to step S1407 to execute a process for deleting the canceled division points and combining sub-shots, thus ending the process.

According to the embodiment described above, after moving image data for one shot is divided into sub-shots, the division points are deleted to remove excessively divided sub-shots using the event frequency information. Hence, the number of sub-shots in moving image data for one shot can be prevented from being excessively increased.

Note that an event type with a high frequency of occurrence may be determined prior to the sub-shot division process of moving image data for one shot, and the determined event may be excluded from the division process into sub-shots upon dividing moving image data.

Figure 15:
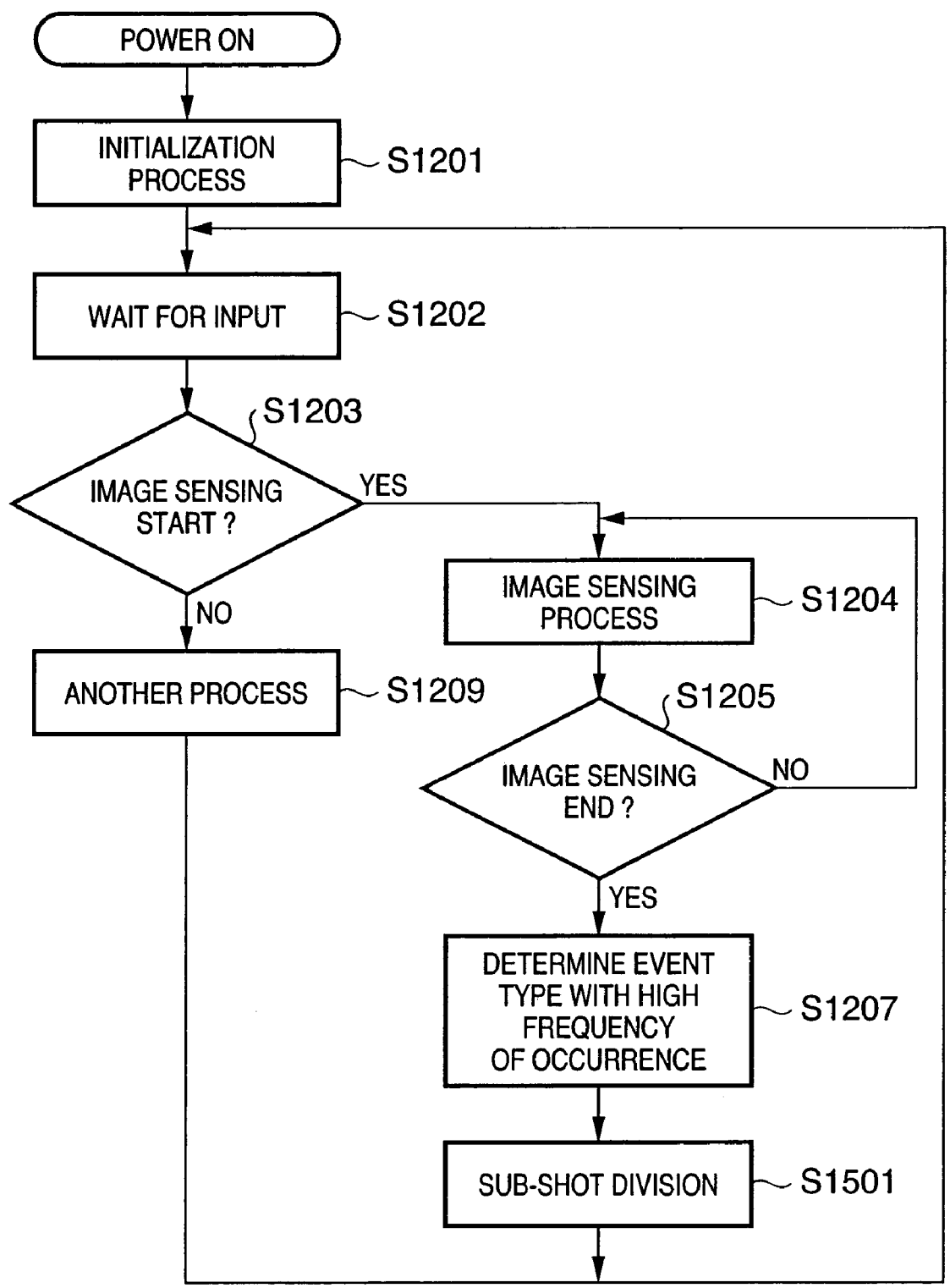
FIG. 15 is a flow chart showing an outline of the operation of an image sensing apparatus of another aspect.

An outline of the operation of the image sensing apparatus which determines an event type with a high frequency of occurrence prior to sub-shot division will be described below using the flow chart of FIG. 15. This flow chart is substantially the same as that shown in FIG. 12, and the same reference numerals are used to identify the same processes. The difference from the flow chart in FIG. 12 is that the step of determining the event type with a high frequency of occurrence (step S1207) is executed before the sub-shot division process step S1206. A sub-shot division process (step S1501) is executed using action information and image sensing environment information associated with event types which are not determined as those with a high frequency of occurrence in step S1207 executed before this step.

The embodiments of the present invention have been described in detail. The present invention includes a case wherein the invention is achieved by directly or remotely supplying a software program that implements the functions of the aforementioned embodiments to a system or apparatus, and reading out and executing the supplied program code by a computer of that system or apparatus.

Therefore, the program code itself installed in a computer to implement the functional process of the present invention using the computer implements the present invention. That is, the appended claims of the present invention include the computer program itself for implementing the functional process of the present invention.

In this case, the form of program is not particularly limited, and an object code, a program to be executed by an interpreter, script data to be supplied to an OS, and the like may be used as along as they have the program function.

As a storage medium for supplying the program, for example, a flexible disk, optical disk (CD-ROM, CD-R, CD-RW, DVD, or the like), magnetooptical disk, magnetic tape, memory card, and the like may be used.

As another program supply method, the program of the present invention may be acquired by file transfer via the Internet.

Also, a storage medium such as a CD-ROM or the like, which stores the encrypted program of the present invention, may be delivered to the user, the user who has cleared a predetermined condition may be allowed to download key information that is used to decrypt the program from a home page via the Internet, and the encrypted program may be executed using that key information to be installed on a computer, thus implementing the present invention.

The functions of the aforementioned embodiments may be implemented not only by executing the readout program code by the computer but also by some or all of actual processing operations executed by an OS or the like running on the computer on the basis of an instruction of that program.

Furthermore, the functions of the aforementioned embodiments may be implemented by some or all of actual processes executed by a CPU or the like arranged in a function extension board or a function extension unit, which is inserted in or connected to the computer, after the program read out from the storage medium is written in a memory of the extension board or unit.

The present invention is not limited to the above embodiments and various changes and modifications can be made within the spirit and scope of the present invention. Therefore, to apprise the public of the scope of the present invention, the following claims are made.

What is claimed is:

1. An image processing apparatus comprising:
   imaging means for imaging and obtaining moving image data composed of a plurality of frames;
   storing means for storing additional information related to an imaging action of said imaging means during the imaging by said imaging means into a storage device;
   dividing means for dividing the moving image data for one shot obtained from the beginning to the end of the imaging into a plurality of segments of the moving image data based on the additional information stored in the storage device; and
   selecting means for selecting a key frame of each segment divided by said dividing means based on the additional information.

2. The apparatus according to claim 1, wherein the additional information includes information associated with a zoom action.

3. The apparatus according to claim 1, wherein the additional information includes information associated with a pan action.

4. The apparatus according to claim 1, wherein the additional information includes an action information associated with an action which was made during the imaging of the moving image data and an environment information associated with an imaging environment during the imaging of the moving image data, and wherein said selecting means selects the key frame using different criteria depending on whether the key frame is selected in accordance with the action information or the environment information.

5. The apparatus according to claim 1, further comprising:
detecting means for detecting that the number of sub-shots obtained by dividing the moving image data for one shot is excessive; and
canceling means for canceling division made based on a predetermined event according to a detection result of said detecting means.

6. The apparatus according to claim 1, further comprising:
detecting means for detecting an event type which occurred at a high frequency of occurrence during the imaging of the moving image data according to the additional information stored in the storage; and
controlling means for controlling the division means so as to stop the division into the sub-shots based on the event type detected by said detecting means.

7. An image processing method used in an image processing apparatus comprising the steps of:
obtaining moving image data composed of a plurality of frames from an imaging unit;
storing additional information related to an imaging action of the imaging unit during the imaging into a storage device;
dividing the moving image data for one shot obtained from the beginning to the end of the imaging into a plurality of segments of the moving image data based on the additional information stored in the storage device; and
selecting a key frame of each segment divided by said dividing step based on the additional information.

8. The method according to claim 7, wherein the additional information includes information associated with a zoom action.

9. The method according to claim 7, wherein the additional information includes information associated with a pan action.

10. The method according to claim 7, wherein the additional information includes an action information associated with an action which was made during the imaging of the moving image data and an environment information during the imaging of the moving image data, and wherein said selecting step selects the key frame using different criteria depending on whether the key frame is selected in accordance with the action information or the environment information.

11. The method according to claim 7, further comprising the steps of:
detecting that the number of sub-shots obtained by dividing the moving image data for one shot is excessive; and
canceling division made based on a predetermined event according to a detection result of said detecting step.

12. The method according to claim 7, further comprising the steps of:
detecting an event type which occurred at a high frequency of occurrence during the imaging of the moving image data according to the additional information stored in the storage; and
controlling the division step so as to stop the division into the sub-shots based on the event type detected by said detecting step.

13. An image processing apparatus comprising:
input means for inputting moving image data composed of a plurality of frames;
a storage means for storing additional information related to an imaging action of imaging means;
dividing means for dividing the moving image data for one shot obtained from the beginning to the end of the imaging into a plurality of segments of the moving image data based on the additional information stored in storage means; and
selecting means for selecting a key frame of each segment divided by said dividing means based on the additional information.

14. An apparatus according to claim 13, wherein said input means includes reproducing means for reproducing the moving image data from a rerecording medium.

15. An apparatus according to claim 13, wherein the additional information includes information associated with a zoom action.

16. An apparatus according to claim 13, wherein the additional information includes information associated with a pan action.

17. An apparatus according to claim 13, further comprising:
detecting means for comparing the number of sub-shots obtained by dividing the moving image data for one shot and a threshold value and for detecting that the number of sub-shots is excessive; and
decreasing means for decreasing the number of sub-shots for said one shot according to a detection result of said detecting means.

18. An image processing method used in an image processing apparatus comprising the steps of:
inputting moving image data composed of a plurality of frames from an imaging unit;
storing additional information indicating contents of events that occurred during the imaging by the imaging unit into a storage device;
dividing the moving image data for one shot obtained from the beginning to the end of the imaging into a plurality of segments of the moving image data based on the events indicated by the additional information stored in the storage device; and
selecting a key frame of each segment divided in said dividing step based on the additional information.

19. The apparatus according to claim 1, wherein said selecting means selects the key frame based on the additional information stored in the storage device and using criteria which is different from criteria used by said dividing means.

20. The method according to claim 7, wherein said selecting step selects the key frame based on the additional information stored in the storage device and using criteria which is different from criteria used in said dividing step.

21. An apparatus for processing moving image data obtained by an imaging unit, the apparatus comprising:
a dividing unit adapted to divide the moving image data for one shot obtained from the beginning to the end of the imaging into a plurality of segments of the moving image data based on additional information related to an imaging action of the imaging unit; and
a selecting unit adapted to select at least one key frame of the plurality of segments of the moving image data divided by said dividing unit based on the additional information.

22. The apparatus according to claim 21, wherein said dividing unit generates management information which includes information indicating a start of the plurality of segments of the moving image data.

23. The apparatus according to claim 21, wherein said dividing unit generates management information which includes information indicating an end of the plurality of segments of the moving image data.

24. The apparatus according to claim 21, wherein said selecting unit selects a plurality of key frames from at least one of the plurality of segments of the moving image data.

25. The apparatus according to claim 24, wherein the dividing unit generates management information which includes information indicating the number of key frames of the plurality of segments.

26. The apparatus according to claim 21, wherein the dividing unit generates management information which includes information indicating the position of the at least one key frame of the plurality of segments.

27. The apparatus according to claim 21, further comprising an acquisition unit adapted to acquire the additional information.

28. The apparatus according to claim 27, wherein said acquisition unit acquires the additional information from a storage unit.

29. An image processing method used in an image processing apparatus to process moving image data obtained by an imaging unit, the method comprising the steps of:
dividing the moving image data for one shot obtained from the beginning to the end of the imaging by the imaging unit into a plurality of segments of the moving image data, based on additional information related to an imaging action of the imaging unit; and
selecting at least one key frame of the plurality of segments of the moving image data divided in said dividing step based on the additional information.

30. The method according to claim 29, wherein said dividing step generates management information which includes information indicating a start of the plurality of segments of the moving image data.

31. The method according to claim 29, wherein said dividing step generates management information which includes information indicating an end of the plurality of segments of the moving image data.

32. The method according to claim 29, wherein said selecting step selects a plurality of key frames from at least one of the plurality of segments of the moving image data.

33. The method according to claim 32, wherein the dividing step generates management information which includes information indicating the number of key frames of the plurality of segments.

34. The method according to claim 29, wherein the dividing step generates management information which includes information indicating the position of the at least one key frame of the plurality of segments.

35. The method according to claim 29, further comprising a step of acquiring the additional information.

36. The method according to claim 35, wherein said acquiring step acquires the additional information from a storage unit.

* * * * *